UNITED STATES PATENT OFFICE.

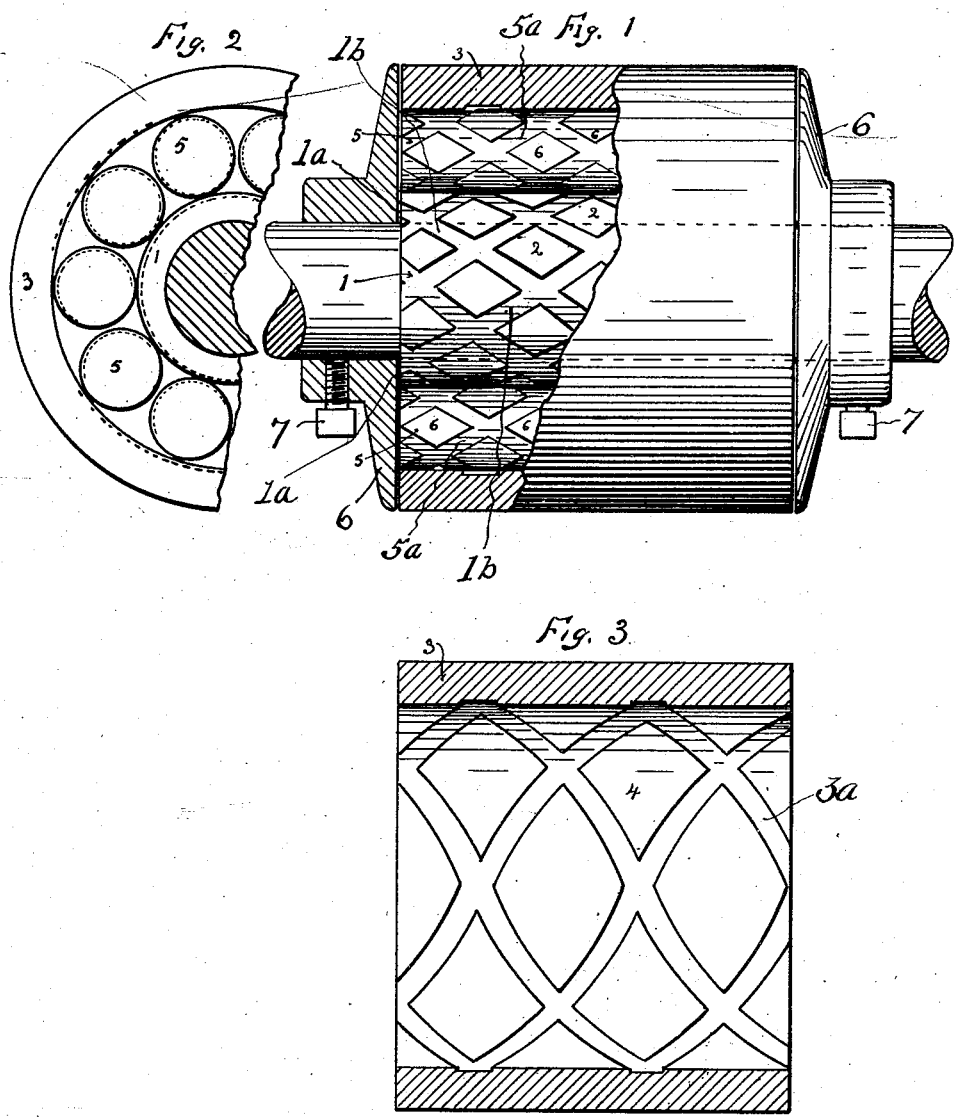

CHESTER A. LATHAM, OF WICHITA, KANSAS.

ANTIFRICTION-BEARING.

938,251.  Specification of Letters Patent.  Patented Oct. 26, 1909.

Application filed March 22, 1905. Serial No. 251,478.

*To all whom it may concern:*

Be it known that I, CHESTER A. LATHAM, a citizen of the United States of America, residing at Wichita, in the county of Sedgwick, in the State of Kansas, have invented certain new and useful Improvements in Antifriction-Bearings, of which the following is a specification.

This invention relates to improvements in roller bearings and has for its object to provide an anti-friction bearing in which the contiguous surfaces of the several members or elements comprising the bearing have a reduced contact portion, thus reducing the friction.

The invention will be better understood by reference to the following description and to the accompanying drawings in which, Figure 1 is a view partly in section and partly in side elevation with the parts assembled. Fig. 2 is an end view with one of the caps or collars removed, and with the shaft or journal shown in section, and Fig. 3 is a longitudinal vertical section of the boxing.

Making renewed reference to the drawing, wherein like characters of notation indicate corresponding parts throughout the several views, 1 designates the journal which may be formed with shoulders $1^a$ by reducing the ends thereof, thus providing an intermediate, enlarged portion of the same length as the boxing and rollers with which it is associated. The periphery of this intermediate portion of the journal is provided with a series of intersecting spiral grooves $1^b$ that provide spaced contact surfaces 2—2 which, by virtue of the spiral arrangement of the grooves, are necessarily of diamond or rectangular shape, as shown.

The boxing or casing 3 has on its inner surface a plurality of intersecting spiral grooves $3^a$ which form spaced contact surfaces 4 of a shape similar to the contact surfaces 2 of the journal.

Interposed between the boxing and the journal are a series of rollers 5, the periphery of each of which is provided with intersecting spiral grooves $5^a$ which form spaced contact surfaces 6 that are adapted to engage with the contact surfaces 2 and 4 of the journal and boxing respectively. The rollers may be held in spaced relation by any suitable means, but I prefer to have them loose with respect to each other, and rotate freely between the journal and boxing. The pitch of the grooves on the different members may vary, so that the raised contact surfaces of one member may be of greater area than those of another; but the arrangement is such that a portion of a contact surface on one member, as for instance the rollers, will engage a portion of the contact surface of another member, as for instance the journal, or the boxing, and thereby reduce the friction to a minimum.

Any suitable thrust bearing may be employed, but I prefer to mount collars 6 upon the shaft of the journal, and these collars preferably fit against the shoulders $1^a$ of the journal and close the end of the boxing. They may be secured by suitable set screws 7, as shown in Fig. 1. The improved raised-contact-surface-boxing may be used with the ordinary journal and roller; or the improved raised-contact-surface-rollers may be used with the ordinary journal and boxing, or the improved raised-contact-surface-journal may be used with the ordinary boxing and roller, and in fact any of the ordinary types of boxing or rollers or journal may be substituted for my improved form, so as to produce a number of combinations, all resulting in a reduction of friction.

It will be noted that the axle, the boxing, and each roller are provided each with reversely arranged intersecting spiral grooves providing alining sets of contact surfaces with each set of the alining contact surfaces of each of the aforesaid elements being spaced from the adjacent alining sets of contact surfaces of the corresponding elements. It will also be noted that the contact surfaces of each set of contact surfaces on each of the aforesaid elements are spaced from one another. The result of providing these elements, to wit, the axle, boxing, and each roller with spiral alining sets of contact surfaces, is that friction is reduced to a minimum, and the lubricant is efficiently distributed throughout the surfaces of the various elements so that the movable elements may rotate freely about the axle. The contact surfaces are relatively small to further reduce friction, and the contact surfaces of the various elements overlap in the operation of the bearing.

Having thus described my invention, what I claim and desire to secure by Letters Patent is:—

1. In a roller bearing, an axle having a cylindrical shaped enlargement provided with reversely arranged intersecting spiral grooves providing alining sets of contact surfaces, each set of alining contact surfaces being spaced from and independent of the adjacent alining sets of contact surfaces, and the contact surfaces of each set being spaced and independent of one another; a boxing having its inner face provided with intersecting spiral grooves providing alining sets of contact surfaces, each set of alining contact surfaces of the boxing being spaced and independent of the adjacent alining sets of contact surfaces of the boxing, and the contact surfaces of each set of contact surfaces of the boxing being spaced and independent of one another; and rollers disposed between the boxing and axle, each roller having intersecting spiral grooves providing alining sets of contact surfaces, each set of alining contact surfaces of each roller being spaced from and independent of the adjacent alining sets of contact surfaces of the corresponding roller, the contact surfaces of each set on each roller being spaced and independent of one another.

2. In a roller bearing, an axle having a cylindrical shaped enlargement provided with reversely arranged intersecting spiral grooves providing alining sets of contact surfaces, each set of alining contact surfaces being spaced from and independent of the adjacent alining sets of contact surfaces, and the contact surfaces of each set being spaced and independent of one another; a boxing having its inner face provided with intersecting spiral grooves providing alining sets of contact surfaces, each set of alining contact surfaces of the boxing being spaced and independent of the adjacent alining sets of contact surfaces of the boxing, and the contact surfaces of each set of contact surfaces of the boxing being spaced and independent of one another; and rollers disposed between the boxing and axle.

3. In a roller bearing, an axle having a cylindrical shaped enlargement provided with its bearing portion of greater diameter than the axle proper to provide a shoulder at each end of said bearing portion, the bearing portion having reversely arranged intersecting spiral grooves providing alining sets of contact surfaces, each set of alining contact surfaces being spaced from the adjacent alining sets of contact surfaces, the contact surfaces of each set being spaced from one another; a boxing having its inner face provided with intersecting spiral grooves providing alining sets of contact surfaces, each set of alining contact surfaces of the boxing being spaced from the adjacent alining sets of contact surfaces, the contact surfaces of each set of the boxing being spaced from one another; rollers disposed between the boxing and axle and each provided with reversely arranged intersecting spiral grooves providing alining sets of contact surfaces, each set of alining contact surfaces on each roller being spaced from the adjacent alining sets of contact surfaces of the corresponding roller, the contact surfaces of each set on each roller being spaced from one another; and collars disposed at the ends of the boxing and against the adjacent shoulders to prevent longitudinal displacement of the rollers.

CHESTER A. LATHAM.

Witnesses:
CHAS. D. FAZEL,
W. M. BARRINGER.